No. 704,399. Patented July 8, 1902.
J. TALUAU.
STAINED GLASS WINDOW OR SIMILAR OBJECT AND PROCESS OF MAKING SAME.
(Application filed Dec. 16, 1895.)
(No Model.)
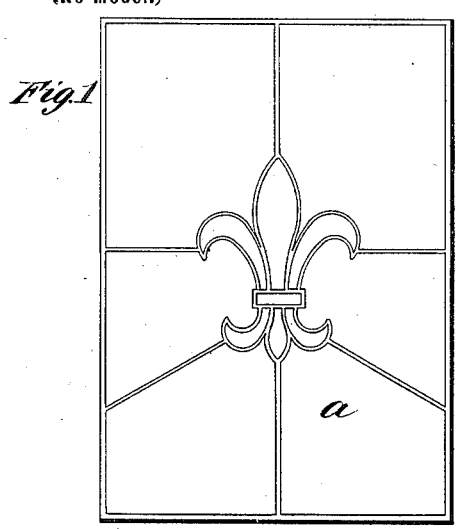
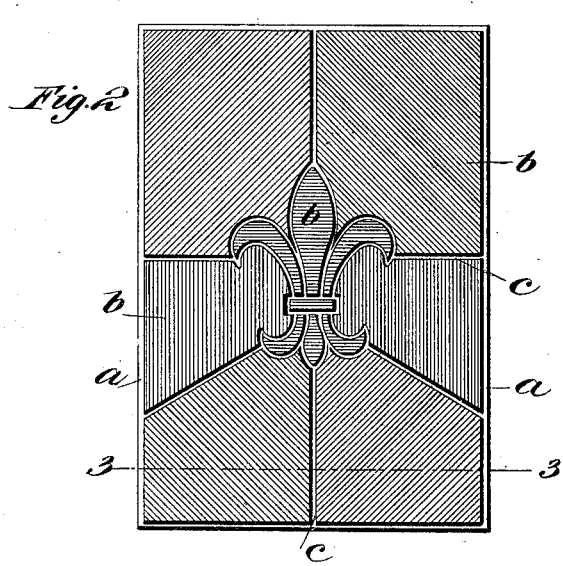
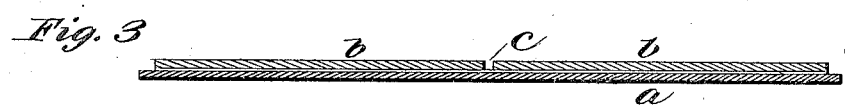
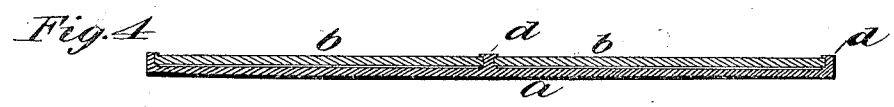
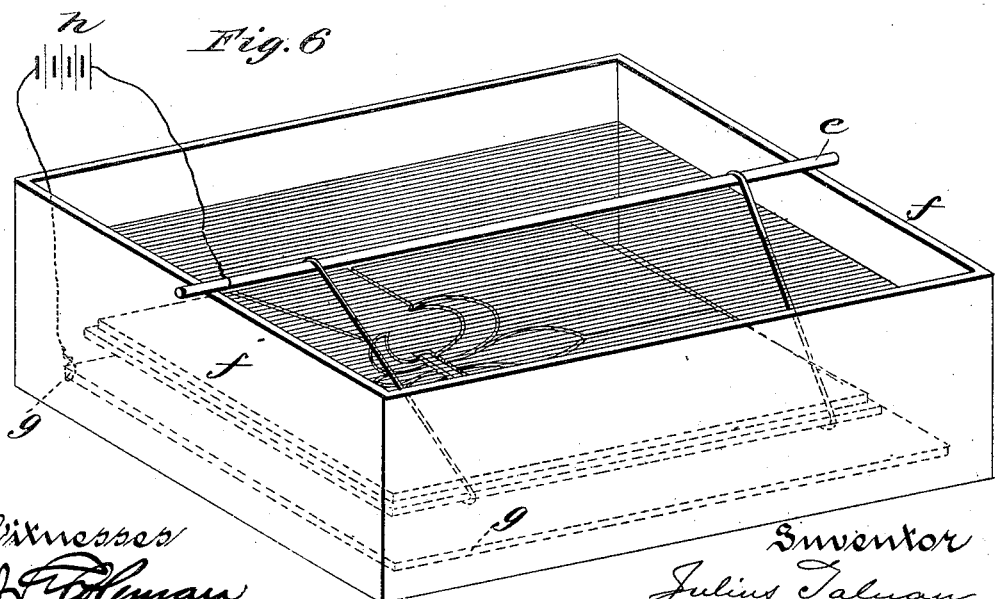
Witnesses
J. T. Coleman
Nellie Callahan
Inventor
Julius Taluau
by Wm. N. Finckel
Atty.

UNITED STATES PATENT OFFICE.

JULIUS TALUAU, OF PHILADELPHIA, PENNSYLVANIA, ASSIGNOR OF ONE-HALF TO HENRY W. SCATTERGOOD, OF PHILADELPHIA, PENNSYLVANIA.

STAINED-GLASS WINDOW OR SIMILAR OBJECT AND PROCESS OF MAKING SAME.

SPECIFICATION forming part of Letters Patent No. 704,399, dated July 8, 1902.

Application filed December 16, 1895. Serial No. 572,318. (No model.)

*To all whom it may concern:*

Be it known that I, JULIUS TALUAU, a citizen of the United States, residing at Philadelphia, in the county of Philadelphia and State of Pennsylvania, have invented a certain new and useful Improvement in Stained-Glass Windows or Similar Objects, of which the following is a full, clear, and exact description.

In the manufacture of leaded or stained glass windows and other transparencies it is usual to employ strips of prepared lead, which are soldered about the adjacent edges of the pieces of glass which are to be arranged according to the selected design. This operation is laborious as well as time-consuming and expensive and at best is only measurably secure.

The object of my invention is to expedite and cheapen the production of such transparencies; and to this end the invention consists in assembling the pieces of glass by the electrodeposition of the metal about their adjacent edges.

In carrying out my invention I first prepare the design in outline upon a sheet of lead or other metal or metalized body and then cement the pieces of glass to this sheet in a manner adapted to admit of handling it in accordance with the design outlined upon such sheet. Spaces are left between the adjacent edges of the pieces of glass sufficiently wide to receive deposits of binding metal. The article thus arranged is then placed in an ordinary electroplating or electrotyping bath and placed in circuit and subjected to the action of the current until there is deposited in the spaces between the adjacent edges of the pieces of glass and around their outer border or the perimeter of the object sufficient metal to hold the component parts of the object firmly together, the metal lapping over the edges as desired. The object is then removed from the bath and the foundation or backing then may be stripped off and the object finished for use. Mosaic work of stone and other electrically non-conductive substances or materials may be similarly constructed, and where transparency is not desired the foundation may remain.

The invention is applicable not only to the manufacture of stained-glass windows, but to globes for gas, electric, and other lights, and it is applicable also to stone, wood, and other materials non-conductive of electricity or of low conductivity.

By my invention heterogeneous materials may be united in a rigid and continuous metal frame, so as to produce a great variety of articles of useful and ornamental character.

In the accompanying drawings, illustrating my invention, in the several figures of which like parts are similarly designated, Figure 1 shows the foundation or backing with a design traced thereon in which the conventionalized fleur-de-lis is the central ornament. Fig. 2 shows the pieces of glass assembled upon this backing ready for the electrodepositing-bath. Fig. 3 is a cross-section taken in the plane of line 3 3, Fig. 2. Fig. 4 is a similar section showing the object after the completion of the electrodepositing process. Fig. 5 is a similar section of the finished object. Fig. 6 is a perspective view of a common form of electroplating plant which may be used in practicing my invention.

In Fig. 1 is shown the foundation or backing $a$, of lead foil or sheet-lead or other metal, upon which is traced the design and which forms one of the electrodes in the bath. $b$, Figs. 2 to 6, are the pieces of glass or other substance which are cemented to this backing or foundation in conformity to the design thereon, with their adjacent edges separated sufficiently to leave the spaces $c$ opening to the backing or foundation and of a width adequate to receive a deposit of metal of sufficient bulk to form a rigid and continuous frame between and around the edges of the pieces.

$d$, Figs. 3, 4, and 5, is the metal deposit, which constitutes the frame by which the pieces of glass are united in a unitary object.

The object having been arranged as in Fig. 2 is suspended from an electric conductor $e$ in a bath $f$, in the bottom of which is an electrode $g$ of opposite polarity to the backing. The backing and this electrode $g$ are then connected in circuit, as the cathode and anode, respectively, with a battery or other source of electricity $h$, and the proper solution or electrolyte being placed in the bath the electric deposition of the metal in the spaces between the pieces of glass and around their outer edges begins and is continued until there is a sufficient deposit to make a secure frame, after which the object is removed and the backing stripped off if a transparency is desired or finished off if to remain on the object. If the metal backing be of a different metal from that deposited to form the frame and it be desired to remove it from the object, it may be so removed in any of a variety of ways—as, for example, by dissolving it chemically by an agent having an affinity for it and not for the metal of the frame.

By the use of the term "metal backing" or "foundation" I wish to include not only a solid or all-metal piece, but also one having a metallic surface that may serve as an electrode.

The backing may be of lead, the anode of copper, and the electrolyte of sulfate of copper in carrying out my invention; but of course I do not limit my invention to the employment of these or other appropriate substances.

I have successfully used a backing of thin lead foil cemented upon a glass plate to give a solid and even support for the object while in the bath.

The backing may be insulated by varnishing at such points as it is desired no deposit shall be made.

Not only may cheapness and expedition be secured by my invention, but the most elaborate kinds of designs comprising the smallest pieces of glass, &c., may be readily manufactured.

The metal frame being formed about the design as described results practically in embedding the glass in place, so that the finished article is as solid and rigid as if it were all one solid piece or sheet. The thus-framed glass or other article requires no cross bars or rods of metal to support it, such as are uniformly used in ordinary stained-glass windows, to which the glass is wired at intervals, and, unlike stained-glass windows, which bend and flex under stress of the elements, let in wind and cold, and by their distortion become unsightly, my frame, being continuous and homogeneous, will preserve its stiffness and integrity and that of the window or other object.

What I claim is—

1. The method of uniting sections of glass or tile, which consists in arranging such sections on a support with their adjacent edges apart, said support provided with a conducting-surface along the spaces between the edges of the sections, and then electrodepositing metal upon said support until the spaces between such sections are filled by the deposited metal.

2. The process of framing or uniting electrically non-conductive objects, such as glass in stained-glass transparencies, which consists in arranging such objects upon an electrically-conductive backing or foundation, in given design, with their adjacent edges apart, and then electrically depositing metal in the spaces between such adjacent edges and around the boundary of the object, substantially as described.

3. The process of framing or uniting electrically non-conductive objects, such as glass in stained-glass transparencies, which consists in arranging such objects upon an electrically-conductive backing or foundation, in given design, with their adjacent edges apart, and then electrically depositing metal in the spaces between such adjacent edges and around the boundary of the object, and finally stripping off the backing or foundation, substantially as described.

4. As an improved article of manufacture, a stained-glass window or other object, composed of a number of pieces of essentially electrically non-conductive material, and a continuous and homogeneous frame of electrodeposited metal between the adjacent edges of the component pieces and around the perimeter of the article as a whole, substantially as described.

5. The method of uniting sections or pieces of glass and other electrically non-conductive material, which consists in arranging such sections upon a conducting-support, with their edges apart, and then electrodepositing metal upon said support until the spaces between such sections are filled by the deposited metal.

6. The method of mounting sections or pieces of glass and other electrically non-conductive material, which consists in arranging the sections or pieces in any desired manner on a conducting-surface, exposing the whole in the electrolytic bath until the interstices between the sections or pieces are filled by the deposit formed on the conducting-surface, and then removing the conducting-surface to expose the faces of the complete product.

7. The method of mounting sections of glass and other electrically non-conductive material, which consists in arranging the sections or pieces in the desired manner on a temporary conducting-surface on a removable support, exposing the whole in the electrolytic bath until the interstices between the sections are filled by the deposit formed on the conducting-surface, then removing the support and conducting-surface to expose the faces of the complete product.

In testimony whereof I have hereunto set my hand this 10th day of December, A. D. 1895.

JULIUS TALUAU.

Witnesses:
SAMUEL E. CARVER,
J. MONSON LAUCHLEN.